Dec. 15, 1959  R. H. THORNER  2,917,142
THROTTLE CONTROL DEVICE
Filed Sept. 2, 1954  3 Sheets-Sheet 1
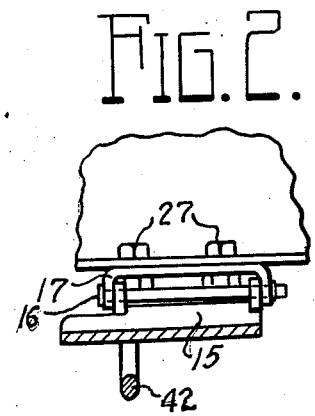
FIG.2.
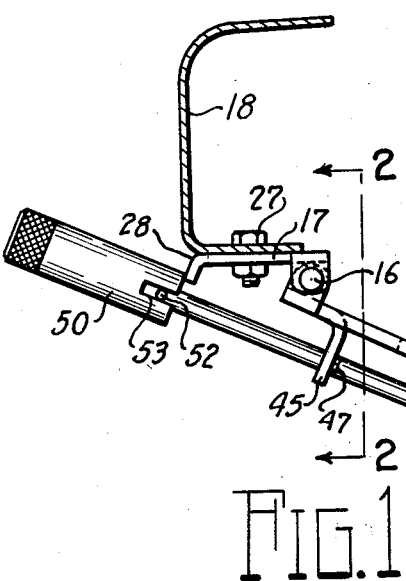
FIG.1.
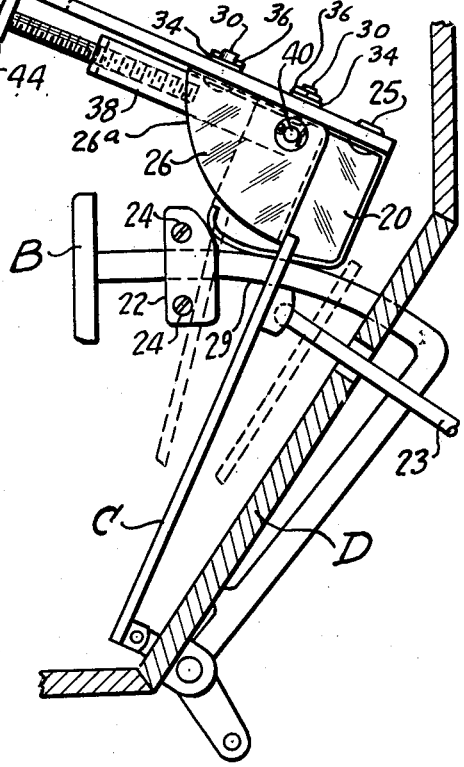
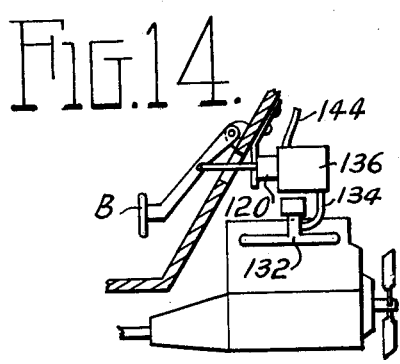
FIG.14.
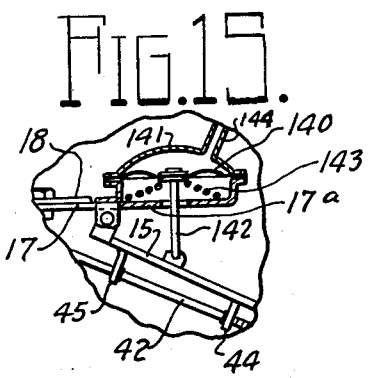
FIG.15.
INVENTOR.
Robert H. Thorner
BY
Owen & Owen
ATTORNEYS

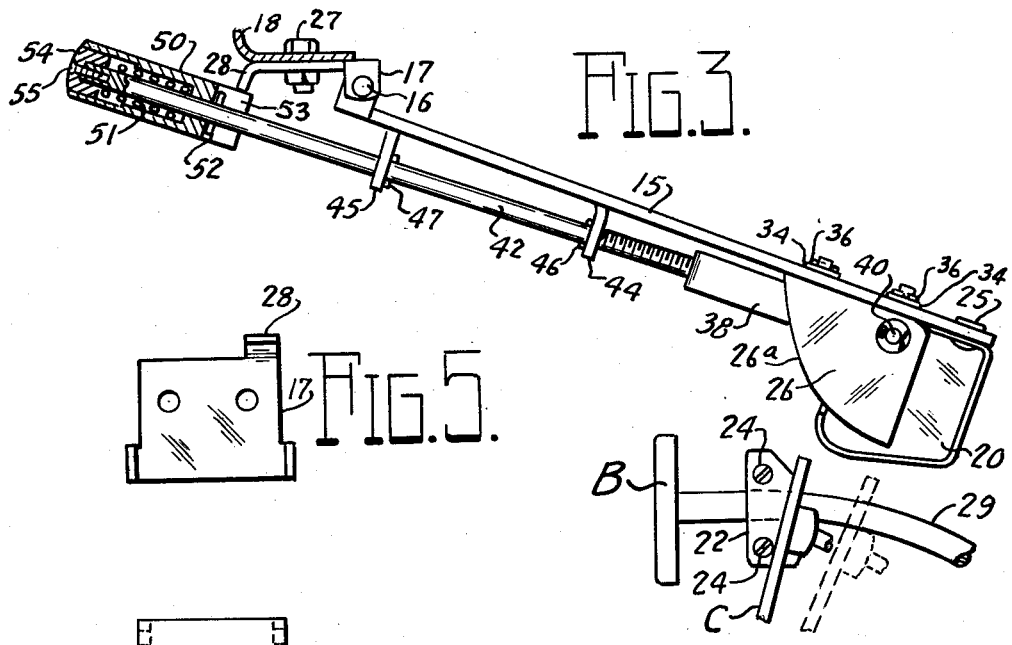
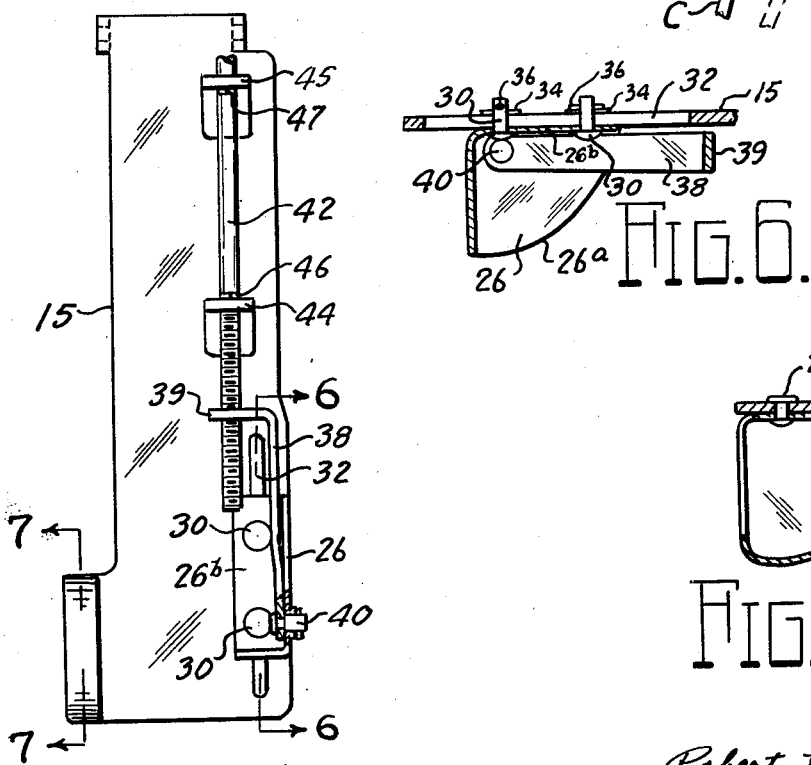

Dec. 15, 1959  R. H. THORNER  2,917,142
THROTTLE CONTROL DEVICE
Filed Sept. 2, 1954  3 Sheets-Sheet 3
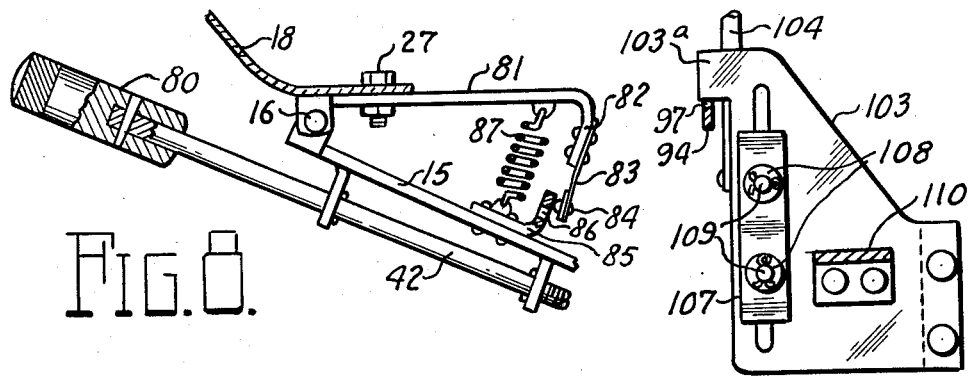
FIG. 8.
FIG. 10.
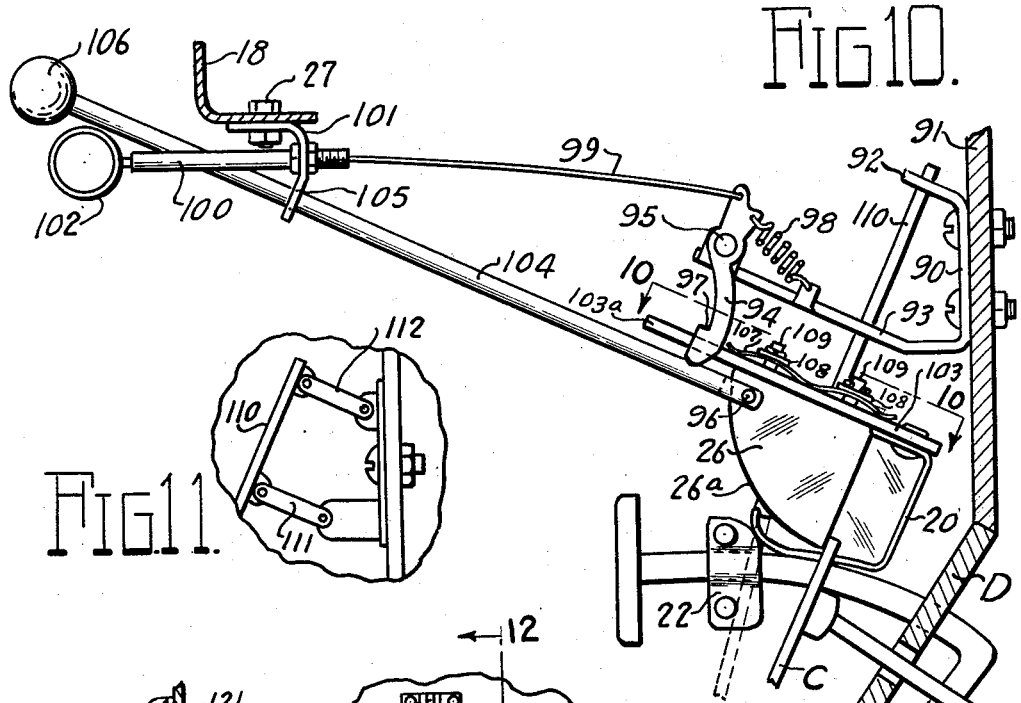
FIG. 11.
FIG. 9.
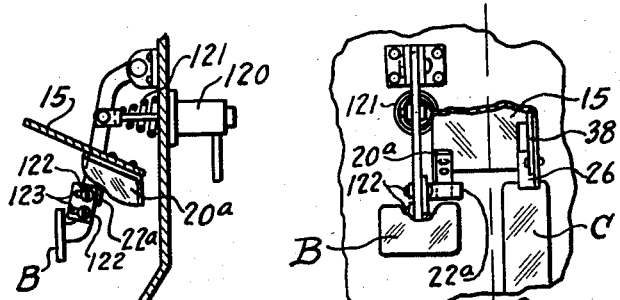
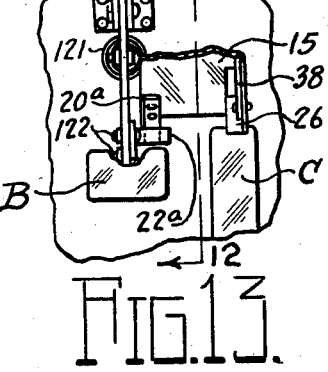
FIG. 12.  FIG. 13.
INVENTOR.
Robert H. Thorner
BY
Owen & Owen
ATTORNEYS

United States Patent Office 2,917,142
Patented Dec. 15, 1959

2,917,142

THROTTLE CONTROL DEVICE

Robert H. Thorner, Detroit, Mich.

Application September 2, 1954, Serial No. 453,745

33 Claims. (Cl. 192—3)

This invention relates to an improvement in a control device to position the control means or throttle for an engine of an automotive vehicle whereby the driver may rest his foot and leg during sustained driving periods. In one form, the invention may be associated directly with the accelerator pedal, preferably in connection with the brake-actuating pedal.

A primary object of the invention is to provide a device to control the throttle of an automotive vehicle which is extremely simple in construction and installation, thus lending itself to low cost manufacture, and is inherently completely safe in its use with automotive vehicles.

Whenever continuous driving of an automotive vehicle at a substantially constant speed is desired, the driver must maintain a predetermined position of the accelerator pedal at all times without relief when driving. As a result, the driver frequently experiences muscle strain particularly in the leg and foot. This result is not only uncomfortable but, more important, tends to produce driver fatigue, which adversely affects the driver's reflex action in emergencies and tends to produce drowsiness or even sleep.

Present "hand throttles" comprising a Bowden wire to the carburetor which have been used for many years on automotive vehicles have proven unsatisfactory primarily because of their lack of safety. Also separate latch mechanisms have been proposed in the prior art to hold the accelerator in a depressed position. But these mechanisms are not acceptable in general because when the operator applies the brake pedal to stop the vehicle the supply of motive fluid to the engine will continue which obviously is dangerous. This same condition also prevails whenever present Bowden wire hand-throttles are used. The use of the brake-actuating mechanism connected to release the throttle-holding device is old in the patent art. But heretofore, such brake-actuated releasing devices have not been completely safe in their construction and operating action, because the accelerator and/or brake pedals have been modified in their structure and operation and the applied mechanisms are hazardous.

Any throttle control device temporarily has sole charge of the accelerator pedal, which pedal can be an extremely dangerous control in an automotive vehicle if not properly regulated at all times. Hence, in order to provide a throttle control device that would gain wide public acceptance, it is essential for the device to be completely safe. Although the patent art shows many such throttle controls, none have ever gained wide public acceptance to date. A few of the important reasons preventing their acceptance are worthy of discussion in order to bring out the inventive concept of the present invention.

The prior art contains numerous throttle control devices using ratchets having a plurality of teeth to hold the throttle or accelerator pedal in any one of several definite positions, each position corresponding to a tooth of the ratchet. Such ratchet mechanisms for positioning the accelerator pedal, even if combined with brake releasing mechanisms, are very dangerous in normal driving for several reasons. One reason is based on a characteristic of an engine which apparently has not been well appreciated by the inventors of these devices. It is a characteristic of the butterfly-type of throttle valve generally used in carburetors for automotive vehicles that at part-throttle positions the change in air flow is relatively large for a slight change in throttle position. Hence the accelerator position is very sensitive in normal driving, particularly at part-throttle positions which comprises the largest share of continuous driving with automotive vehicles.

This effect can be dangerous if the driver wants to increase his speed and moves the accelerator pedal to the next tooth of the ratchet. Due to the sensitivity of the throttle, it might often happen that the increased speed would be too fast for safe driving in the existing traffic conditions; but the operator will drive at this unsafe increased speed since the previous speed was too slow for him.

The ratchet-type of mechanism for positioning the throttle also adds an element of danger when suddenly the controlled speed must be exceeded in emergencies. It is true that the accelerator pedal may be depressed to give the higher speed, but the pedal is then locked in this high-speed position and cannot be returned to the normal driving position without inactivating the device; and if the accelerator pedal is arranged to be released by the brake action, it would obviously be quite dangerous to depress the brake for inactivating the control device before accelerating or opening the throttle in emergencies.

Another factor in many of the prior attempts to solve this problem and which, in certain installations may be dangerous, is that sliding members having close-fitting contacting surfaces are used to activate or inactivate the device. It is not desirable to have such sliding surfaces positively held together for close sliding movements to release the accelerator pedal since the wedging action of dirt or other foreign matter could cause the parts to stick and seize and therefore could be dangerous. In many of the prior devices these sliding releasing members must be located near or even below the driver's foot where dirt or other foreign matter therefrom may interfere with the normal action of such sliding members. This problem is not severe in those devices in which the sliding members have relatively small contact area and are located well above or away from the driver's foot, and in which the releasing movement is produced by positive mechanical means. This factor becomes extremely dangerous in those prior devices in which the release-effecting member is positively connected to the throttle and relies solely on springs, solenoids, or vacuum to cause the release. This last factor is most dangerous when such positive-connected release-effecting members are associated with a sliding vacuum piston wherein the vacuum tends to draw fine dirt or dust from the air into the small clearance between the piston and its cylinder.

Still another dangerous characteristic of many prior attempts to solve this problem is that foot-operated means that require special foot-movements are provided to activate or to inactivate the throttle control device, or both. In this regard, it is highly important to appreciate that the foot is solely responsible for the movements of the brake and accelerator pedals which are the two most important controls in an automotive vehicle; and these two controls are the most dangerous if normal movements are interfered with or revised. If the driver's foot is given the responsibility of additional movements such as to activate a throttle-control device, then the normal, almost reflex, driving habits of the foot have been changed which is not desired from a safety standpoint. However, the occasional use of the driver's hand is not dangerous as evidenced by the many other uses made thereof, such as for cigarette-lighters, radios, windshield wiper accessories, turn indicators, etc. Hence, in view of the obvious danger of changing the normal habits of the driver's foot, it appears to be highly desirable to have the combination of elements of a throttle control device so arranged to release entirely automatically as a result of normal driving habits and wherein such releasing action is entirely incidental thereto. Accordingly, it appears desirable for such a throttle control device to be activated by hand-operated means for the reasons discussed above, while deactivation is an incident to normal driving.

Also in this regard and with reference again to the ratchet-type of means to position the throttle, it is highly desirable from a safety standpoint, for the reasons described above, to provide a combination of elements in which the throttle-positioning means is adjustable by hand rather than by the foot as with the ratchet-type of devices.

Many of the prior devices shown in the patent art disclose one or even several of the desired safety features discussed herein. But no disclosures in the past art has set forth a combination of elements which includes enough of the important characteristics necessary to provide sufficient safety to win public acceptance. Accordingly, it is a primary object of the present invention to provide a throttle control device having such a unique and simple arrangement of its combination of elements as to provide sufficient total safety features to gain public acceptance of the device.

Another object of the present invention is to provide a throttle control device of the above character including shiftable means to hold the accelerator pedal in any desired predetermined position, and which is instantly and releasably inactivated by depression of the brake pedal in a manner such that all parts of the device are moved completely clear of the path of travel of the accelerator and/or its linkage as well as the brake pedal, which are then structurally and operatively unchanged from normal operation without said throttle control device.

Another object of the present invention is to provide a throttle control device of the above type which will permit independent and unrestricted normal movements of the accelerator pedal in a direction to increase the speed of the vehicle above the speed established by said device, which pedal functions at this condition without any structural or operative changes from normal operation without said device, and which therefore permits a burst of speed whenever desired for passing another vehicle, or hill-climbing, for example.

Still another object of the present invention is to provide a throttle control device of the foregoing character, including means to lock the device and all parts associated therewith completely clear of the normal path of travel of the accelerator and/or its linkage.

Another object of the present invention is to provide a control device as defined in the preceding paragraph in which manually actuated means are provided to release said locking device, so that said control device may be moved into its normal operating position.

Still another object of the present invention is to provide a throttle control device as above described in which the releasing movements which move the device clear of the accelerator pedal follow along a substantially raised vertical direction, and the movement to reactivate said device being effected in a substatnially downward vertical direction as a result of the weight of said device.

Another object of the present invention is to provide a throttle control device in which novel means are provided to hold the device out of engagement with the engine control means when it is desired to drive the vehicle in a normal manner, and for manually returning the device into operative position when desired.

Other objects and advantages of the invention will become apparent from the following description and from the accompanying drawings in which—

Fig. 1 is a side elevational view of a preferred form of my throttle control device shown in its operative position in an automotive vehicle, the vehicle parts being diagrammatically indicated in section;

Fig. 2 is a section on line 2—2 in Fig. 1;

Fig. 3 is a view of the device shown in Fig. 1 raised and locked completely clear of the brake and engine control actuating mechanisms, and further shows a sectional view of the novel means to provide a locking action in the "off" position;

Fig. 4 is a bottom view of the swingable means shown in Figs. 1 and 3;

Fig. 5 is a bottom view of the bracket which is secured to a fixed support such as the instrument panel as shown in Figs. 1 and 3;

Fig. 6 is a section on line 6—6 of Fig. 4;

Fig. 7 is a section on line 7—7 of Fig. 4;

Fig. 8 is a fragmentary view of a modified form of my invention similar to Fig. 1, but showing another form of locking means for holding the swingably movable mechanism completely clear of the brake and engine control actuating means;

Fig. 9 is a side elevational view of a modified form of latching and setting mechanism;

Fig. 10 is a section on line 10—10 of Fig. 9;

Fig. 11 is a fragmentary side view of a modification of the supporting means of the device in Fig. 9;

Fig. 12 is a fragmentary side elevational view partly in section of a modification of the form of my invention shown in Fig. 1 adapted to function with the suspended-type of brake pedal;

Fig. 13 is a fragmentary front view of the device shown in Fig. 12;

Fig. 14 shows a conventional arrangement of a power brake installation; and

Fig. 15 shows novel means associated with power brakes to assist in the releasing action.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not limitation.

In the drawings there is shown by way of example a portion of an automotive vehicle embodying the present invention. Referring to the drawings, and particularly to Figs. 1 to 7, the present invention is there shown as applied to an installation in an automotive vehicle for the purpose of controlling the throttle and hence the flow of gas mixture to the engine and thus to establish the speed of the engine. The conventional brake pedal B and accelerator pedal C are shown in relation to the floorboard D. It will be appreciated that any kind of automotive vehicle and engine may be controlled by my invention in addition to the usual throttle-controlled gasoline powered carbureted engine. The term "throttle" as used herein is intended to embrace the energy-controlling member of any engine, such as the fuel pump of a Diesel engine or the fuel control of an automotive gas turbine engine, for example.

Referring again to the drawings, the form of the invention there shown comprises an arm or lever 15 shown as a plate of rectangular cross-section and hinged at 16 to a bracket 17 fixed to any stationary portion of the automobile such as the under-part of the dashboard 18. If space is unavailable under the dashboard the bracket may be secured elsewhere such as to the steering post. The arm 15 carries a cam 20 secured to its lower end by any suitable fastening means such as by rivets 25, or it may be an integral part of the arm 15. The cam 20 is positioned in the path of travel of the brake pedal B, and it rests on the shaft 29 to maintain the arm 15 and the parts carried thereby in a predetermined angular position about the hinge 16. The cam 20 is disposed to cooperate with an actuating cam 22 carried on the shaft 29 of the brake pedal B. The actuating cam 22 is adjustably mounted as by clamping screws 24 to be just touching the cam 20 with the brake pedal in the free position as shown in Fig. 1. Thus, with the brake released there is no "dead space" between the cams 20 and 22 so that cam 20 is moved instantly and simultaneously with the slightest movement of the brake pedal. The cooperating contacting surfaces of the cams 20 and 22 are so contoured that with further depression of the brake pedal the cam 20 and the arm 15 move upwardly enough to effect a release of the accelerator pedal in a manner to be discussed; and a predetermined travel of the brake pedal is required to move the actuating cam 22 to produce the maximum rise of the cam 20, which travel preferably is very short as will be explained.

An adjustable accelerator pedal detent 26 having a cam portion 26a is also carried by the arm or lever 15 and is disposed laterally in the operating position of the control device to lie in the path of travel of the accelerator pedal C or an extension thereof. The accelerator pedal is connected to the throttle of the engine by means of the linkage 23 extending through the floorboard D in a manner well known to those skilled in the art. Accordingly, by controlling the accelerator pedal, the device controls the engine throttle through the normal accelerator linkage, all of which elements operate as a unit or assembly. The detent 26, as shown in Figs. 4 and 6, has an inturned portion 26b which receives any suitable mounting device to restrain it against lateral and vertical displacement in relation to the arm 15 and yet permit the pedal detent to slide lengthwise in relation to the arm during manual adjustment to be described hereinafter. For this purpose, in the form shown, a pair of headed fasteners 30 are passed through the inturned portion 26b and have their stems received in a slot 32 in the arm and are fastened by washers 34 and pins 36 to permit the sliding movements. The detent 26 also includes a surface 26a which acts as a guide or cam for purposes to be described.

An operating stem-receiving link 38 is attached to the detent 26 by a hinge pin 40. The link has a free end 39 inturned and tapped to receive a threaded operating stem or shaft or rod 42. The stem 42 thus constitutes a threaded adjusting member by which the longitudinal position of the detent 26 may be changed with respect to the arm 15 to give a greater or lesser depression of the accelerator pedal C which cooperates with the detent when in the operating position as hereinafter described.

The operating stem 42 is supported with respect to the arm 15 in any suitable manner, as by ears 44 and 45 struck downwardly from the body of the arm. Pins 46 and 47 in engagement with opposite faces of the ears prevent the adjusting or operating stem 42 from moving longitudinally in relation to the arm 15; thus turning movements imparted thereto will serve only to move the detent 26 rightwardly or leftwardly, as viewed in Figs. 1 and 3, depending on the direction of rotation of the stem to increase or decrease the depression of the accelerator pedal C.

At its outer end the operating stem 42 carries a latching handle 50 mounted for limited axial sliding movements over the stem 42 and biased rightwardly by a spring 51 (Fig. 3). The handle 50 has a slot 53 at its inner end to receive a pin 52 secured to the stem 42. The spring 51 is retained by any suitable means such as by a guide piece 54 secured to the end of the stem 42 and fastened by screw 55. The guide piece 54 also helps to guide the handle 50 in its axially sliding movements. With this construction rotational movement of the handle may be transmitted through the pin 52 to the stem 42 for the purpose of adjusting the longitudinal position of the detent 26 and thus the degree of depression of the accelerator pedal C and the speed of the vehicle. The cam 20 and detent 26 are high enough that all portions of the arm and stem are above and clear of all normal foot movements at all times. The detent may comprise a flat strip of metal in sliding relation to the arm 15 if the accelerator is made with a special extension as a part thereof or secured thereto, so that the detent would be positioned above the operator's foot. Accordingly, the form or shape of the detent 26 in relation to the arm 15 is not important in construing the inventive concept.

Fig. 3 shows the control device in its inoperative position, and Fig. 1 shows the parts in their operative position. The bracket 17 is provided with a tab or latch extension 28 bent downward to cooperate with the latching handle 50. It will be seen in Fig. 3 that the latch extension 28 is in abutting contact with the periphery of the handle 50 due to the weight of the parts to the right of the pivot 16 such as the cam 20, the detent 26, and the arm 15. In this position, the handle 50 is held in its extreme rightward position against the pin 52 by the spring 51. In Fig. 1 the handle 50 has been pulled to the left and the latch extension 28 is held by spring 51 in abutting contact with the inner face of the handle; and the control device is then held in a definite angular position by means of the cam 20 resting on a suitable support such as the brake pedal shaft 29. If desired, as an alternative, the assembly can be held in operating position by the extension 28 resting on the shaft 42. Thus the weight of the operating parts to the right of the pivot 16, which are heavier than the parts on the left side, normally biases the assembly into operative position. However, the abutting contact between the extension 28 and the periphery of handle 50 prevents this movement until the handle is pulled outwardly against its spring to the position shown in Fig. 1, whereupon the weight of the assembly will act around the pivot 16 to bring the cams and detent into operative relationship to the brake and accelerator pedals.

The operation of the form of the device above described is as follows. With the parts retained in the inoperative position shown in Fig. 3, the vehicle may be operated in a completely normal manner without any possible interference from the parts of the control device. When the operator desires to use the control device, two distinct steps which require conscious mental effort are required, thereby enhancing the safety characteristics of the device. First the operator must pull outwardly on the handle 50 so that its inner face clears the extension 28 of bracket 17. The weight of the operating parts to the right of pivot 16 then urges the parts into operative position. Secondly, the operator depresses the accelerator pedal C to bring it in contact with the guide or cam surface 26a which slightly raises the detent 26 and arm 15 without lowering the handle 50 below extension 28 until the pedal C passes the right end of the detent. At this time, the detent drops downwardly by gravity until in the present instance, the cam 20 rests on the brake pedal shaft 29. The detent then extends slightly below the end of the accelerator pedal which abuts against the detent and is thus held in the desired position. The speed of the vehicle is then adjusted by turning the handle 50 to change the position of the detent 26 and accelerator pedal by means of the sliding adjustment of this member in its mounting slots on the arm or lever 15.

The vehicle will thereafter continue to operate with the accelerator pedal C in a fixed position, and on reasonably level roads will thus maintain a relatively constant speed as discussed hereinafter. If, however, the operator wishes to exceed the set speed to pass another vehicle or to increase the throttle opening to ascend a hill, he need only press the accelerator pedal C beyond its fixed position. This can be done without any interference whatever from the attachment comprising the present invention because there is only an abutting contact of the accelerator pedal with the detent 26. In this regard, it will be seen that the accelerator pedal C is free to move at any time from its abutting contact with the end of the detent 26 all the way to the floorboard D with no interference of any kind. As soon as the other vehicle has been passed or the hill ascended, the driver may again remove his foot from the accelerator pedal C which will return to its abutting contact with the detent 26 and the set speed of operation will be resumed. Thus it is significant that the accelerator pedal may be returned to its abutting contact with the detent without any inerference whatever which is as important as having the pedal free to move to the floorboard without interference.

As previously explained, the contacting surfaces of the cams 22 and 20 are contoured so that the slightest depression of the brake pedal B raises the cam 20 and detent 26; this action not only releases the accelerator pedal C, but also important, it moves the handle 50 well below the extension 28. This movement permits the spring 51 to move the handle 50 under the extension 28 as shown in Fig. 3; and when the brake pedal is released, the handle abuts vertically against the extension 28 to hold the control device in the angular position shown in Fig. 3 completely clear of the accelerator and brake pedals and all normal movements thereof. Accordingly, whenever it is necessary to use the brake pedal for slowing down or stopping, the control device in the preferred arrangement automatically "locks up" out of operation. Then to reactivate the device it is only necessary manually to pull out the handle 50, whereupon the device drops into operating position, and then depress the accelerator pedal past the detent 26.

I have found that the device arranged in the foregoing manner is completely safe, because if traffic conditions are heavy so that the brake is used frequently, the control device "locks-out" of operation so often that the driver will not bother to use it since it is not worthwhile under these circumstances. But when traffic conditions are light with infrequent use of the brake pedal, such as on highway driving without congested traffic, the driver will find that the control device is most beneficial and hence will use it under these conditions. In order to accomplish the foregoing objective, the cooperating faces of the cams 20 and 22 are contoured as steep as practicable so that a relatively short depression of the brake pedal will automatically "lock-up" the device completely out of operation.

Such locking-out of the control device by a slight depression of the brake pedal provides a release which does not require a separate or new driving operation, but occurs as a result of present normal driving procedures. Hence, no conscious mental effort or extra movements are required to inactivate the device. This characteristic is virtually essential in split-second emergencies when using such a throttle control device.

Also, it is important in such throttle control devices to provide positive locking means for holding the device in its inactive position; but equally important, such locking means must be free from the possibility of an inadvertent activation of the device by the driver's knee or arm, or by vibration of the vehicle, etc. This characteristic is important, since such unintentional activation during normal driving might produce an element of surprise to the driver which can be quite dangerous under certain driving conditions since the driver would not expect the device to be in operation.

When the control device of the present invention is in its locked position, the force of the spring 51 is sufficient to prevent any possible inadvertent activation because of the positive locking action of the handle moved under the extension 28. Then, as explained above, if the handle 50 were pulled out inadvertently, it would still be necessary to depress the accelerator past the detent to activate the device. It is obviously quite improbable because of the positive locking mechanism that a person's knee, arm or other factors such as vibration could activate the device of the present invention unintentionally.

It is also important to appreciate that one of the features of the present inventive combination contributing to the inherent overall safety of operation with the device is that the releasing action is effcted by positive mechanical means in which the cam 22 positively moves cam 20 upwardly when the brake pedal is depressed. The prior art shows many examples of reliance on solenoids, springs, vacuum, etc., to effect a release of the accelerator pedal or carburetor throttle; but such means are completely dependent on separate sources of energy and hence are extremely dangerous in the event of their failure. With the positive mechanical release of the present invention, the main source of energy is the manually operated brake pedal which, of course, is as reliable as normal driving without the control device.

An alternate method for releasing the control device is to press downwardly on the handle 50 to disengage the handle from the extension 28 against which it has been abuttingly retained. The handle will snap rightwardly (as viewed in Fig. 1) under the influence of the spring 51 to a position beneath the extension 28 in which the detent 26 is held vertically above and clear of the accelerator pedal C and is thereafter entirely free therefrom. However, I have found it completely safe to rely on the brake pedal for inactivating the control device.

It must be appreciated that the use of any throttle control device, while advantageous for the reasons described above, temporarily has sole control of the enormous power available in present automotive engines. Accordingly, in the interests of safety, it is imperative that such throttle-control devices be extremely simple and foolproof. The arrangement of the combination of elements comprising the present invention provide complete safety for the following reasons:

(1) When the control device is in the inoperative position, all elements thereof are held completely clear of the brake and accelerator pedals and the operation thereof is completely unchanged from normal operation without the control device installed.

(2) A locking device is provided which is positive in keeping the unit out of operation until it is intentionally activated by hand. Hence the throttle control device cannot move into operating position as a result of vibration or by accidentally striking the device with a knee, arm, etc.

(3) It is unnecessary for the driver to use his foot to activate the device which would require a change in his driving habits. In all forms of the present invention, the combination of elements are so arranged that the driver must activate the device by hand so that the normal driving habits of the foot are unchanged. Such driving habits are subconsciously automatic, and any change in these normal habits of foot movements may impair his reflex action.

(4) Two steps are required, each requiring conscious mental effort and manual movements, to activate the device. First the handle 50 must be pulled out to drop the detent 26 into position, and secondly the accelerator pedal must be depressed past the detent before the device is actually in operation which is incidental to the normal foot-movement to increase the speed of the vehicle.

(5) The adjusting means of the combination of elements comprising the present invention is such that the accelerator pedal and its connecting throttle may be set (even while driving) in any desired position regardless of the inherent sensitivity of the throttle.

(6) The foregoing adjusting means of the present invention are operated by the driver's hand rather than his foot. Hence the driving habits of the operator's foot are not changed to provide a speed adjustment which is desirable for the reasons described in the previous paragraph.

(7) The accelerator pedal may be instantly depressed to the wide-open-throttle position for maximum acceleration or power at any time while the throttle control device is in operation since it abuts backwards against the detent 26. Movement between the detent and the floorboard D is completely unrestricted in both directions at all times, so that the accelerator pedal is returned to its previous position merely by removing the foot.

(8) The throttle control device of the present invention releases instantly as a result of normal driving procedures; hence the device requires no conscious mental or physical effort by the driver and thus requires no change in driving habits to effect a release.

(9) The releasing action of the throttle control device is effected by the positive mechanical cooperation of cam 22 moving cam 20 upwardly upon depression of the brake pedal.

(10) There is no delay in the releasing action since there is no "dead space" between the cams 20 and 22 when the brake is in its released position.

(11) The structural arrangement of the combination of elements comprising the present invention includes no close-fitting sliding parts either to activate or inactivate the device. The only friction member in the preferred form of the device (Figs. 1–7) on which the release action depends is the hinge 16; the resistance of which is negligible in view of the large mechanical advantage produced by the long arm 15 having at its end the weight of the cam 20 and detent 26. Also, this sole member, hinge 16, which supports the device during the releasing movement is located well above the driver's foot where dirt or other foreign matter therefrom could not possibly produce adverse effects.

(12) With the cams 20 and 22 in the preferred arrangement, the control device not only releases but is "locked-up" upon each slight depression of the brake pedal. Thus it is impractical to use the device for city or highway driving with congested traffic so that the device will primarily be used for driving when the traffic is not congested.

All forms of the present invention are shown with vertical movements of the cam and detent assembly both to activate and inactivate the device. However, the device could be modified to move in a direction other than vertically; but the normal obstructions in any automotive vehicle make such other movements less practicable than the forms shown in order to realize the safety features itemized above.

The present device does not compensate for the effect of hills whereupon the speed reduces when ascending a hill and increases when descending a hill. However, in most localities, the highways are reasonably level with a minimum of hills for at least about 75% of normal driving. Hence the present invention may be used in these conditions wherein the driver does not hold his foot on the accelerator pedal continuously thereby producing strain; but he can rest his foot and leg intermittently at these times for a major portion of any road driving. I have found that the slight variations in speed when using the device on moderate hills with the automobile lightly loaded is not objectionable. However, for steeper hills and/or a heavily loaded automobile, I have frequently found it necessary because of the speed variations to inactivate the throttle control device by lightly pressing on the brake pedal or pressing down manually on the handle 50 (Fig. 1) until the device is locked out of operation.

Another novel characteristic of the inventive structure disclosed herein has proven to be highly desirable. Referring to Fig. 1, if the driver merely "ticks" the brake pedal and removes his foot without actually applying the brakes, the detent 26 is raised sufficiently to release the accelerator, but the handle 50 is not lowered sufficiently below the latch extension 28 to permit the handle to move into the position shown in Fig. 3 and lock the device out of operation. In this instance, the driver can re-engage the device without pulling the handle 50 merely by depressing the accelerator which acts on the cam or guide surface 26a to raise the detent sufficiently for moving the accelerator past the detent which again drops into the position shown in Fig. 1, as previously described. I have found that this feature of the device has particular utility in numerous driving siutations whenever it is desired to reduce speed temporarily. For example, when entering a curve, the driver "ticks" the brake pedal as above described to reduce the speed, and after the vehicle has travelled sufficiently in the curve, the driver merely depresses the accelerator into engagement without pulling the handle 50 to resume the set speed. In another situation, when approaching a stop light which has been red for a while and will require a reduction in speed before it turns green, the driver "ticks" the brake pedal as he approaches the light, and when it turns green he merely depresses the accelerator pedal into engagement without pulling the knob 50 to resume the set speed. This "ticking" feature can also be utilized by the driver when approaching a slower vehicle on turnpikes and a second vehicle is passing his vehicle on his left and the driver must reduce speed temporarily before passing the first vehicle. Also, when descending a steep hill, the driver can "tick" the brake pedal and coast down the hill without exceeding the speed, and then merely depress the accelerator without pulling the handle to re-engage the device. However, in all cases, a full application of the brakes raises the detent 26 sufficiently to permit the handle to move into the position shown in Fig. 3 in which the device is locked out of operation, and the handle must be pulled before the device can be engaged again.

My throttle control device may be used with an engine equipped with a conventional speed governor control in which the governor setting may be utilized to maintain substantially constant engine speed as the load varies from no-load to full-load. In this instance the throttle control device would be set by the operator to hold the accelerator pedal at a wide-open-throttle position, and the engine speed would thereaftar be controlled by the governor. As soon as the driver depresses his brake pedal or releases the throttle control device by hand, the vehicle may thereafter be operated in a normal manner and the control of the engine shifts instantly from the governor back to the operator. Such a construction is of particular benefit in the instance of trucks and similar heavy vehicles that are now commonly equipped with governors.

It will be apparent that the mechanism for holding the control device in its inoperative position may assume various forms depending on the construction of the vehicle and other factors. A modified form of latching device is shown in Fig. 8 in which the spring-pressed handle 50 of Fig. 3 is replaced by a simple fixed handle 80 and the mounting bracket 17 is replaced with the modified bracket 81 which provides a downwardly extending end member 82 to which a latching spring 83 is attached. A semispherical detent 84 is carried by the latching spring and cooperates with a lug 85 having a recess 86 properly located to retain the assembly in its raised, inoperative position. The lug 85 is carried by the arm 15. If desired, a counterbalancing spring 87 may extend between the bracket 81 and the arm to reduce the effort required to raise the weight of the assembly from operative to inoperative position in which it will be retained by reason of the entry of detent 84 into the recess 86. When it is desired to use the control device, the driver pulls upwardly on the handle 80 to disengage the latching device, and the cams at the lower end of the arm will move into position to cooperate, as above described, with the brake and accelerator pedals.

Fig. 9 shows another modification of the invention in which the cam assembly is substantially the same as shown in Figs. 1–7, except that it may be mounted anywhere in the vehicle such as on the rear wall of the engine compartment rather than the dashboard as in the previously described forms. Fig. 10 is a section of Fig. 9 to clarify some of its details. In the form shown, a bracket 90 is fixed to the firewall 91 by any suitable fastening devices, and is provided with outwardly extending upper and lower arms 92 and 93. The lower arm 93 serves as a convenient mounting for a latching device having lever 94 pivoted at 95. The lever 94 is provided with a latching shoulder 97, and a biasing spring 98 is connected to the arm 93 and urges the lever into latching position. A cable 99 is connected to the latching device 94 and is slidable through a guide bushing 100 fixed to the bracket 101. A ring 102 is connected to the cable for effecting a releasing action of the lever 94.

A main supporting plate or base 103 which is equivalent to the arm 15 of Figs. 1–7, carries the detent 26 which is mounted for sliding movement with respect to the plate and is connected to the end of a stem 104 by any suitable hinge means 96 such as a hole in the stem having a pin therethrough. The stem extends leftwardly, as viewed in Fig. 9, through the bracket 101 adjacent the vehicle dashboard 18 so that the bracket acts as a hinge or fulcrum at 105. The size of the aperture in the bracket at 105 is sufficient to facilitate both axial and angular movements of the stem 104. A ball-handle 106 is secured to the stem 104 for actuation thereof. The detent 26 may thus be moved to its adjusted position by axial manipulation of the handle 106 which moves the stem 104. A wavy leaf spring 107 is used as a friction-lock member to maintain any set position of the stem. This spring produces sufficient friction force to maintain the accelerator pedal in any pre-set position, but the spring force is low enough that the accelerator pedal can be moved by the stem 104 which is hand-actuated by the handle 106. The spring 107 is compressed a predetermined amount by washers 108 which are held in place by pins 109 secured to the detent 26.

In this modification, the cam and accelerator detent assembly is supported on the end of a floating rectangular bar 110 which is received for guided sliding movements in suitable openings in the bracket arms 92 and 93 which are located well above or away from the normal position of the driver's foot. The cam and detent assembly normally assumes its operative position due to its own weight whereby cams 20, 22 and the detent 26 are in the path of travel of the brake and accelerator pedals, respectively. As in the previously described form, the assembly is raised vertically by depressing the brake pedal slightly so that the cam 22 urges the cam 20 upwardly until the shoulder 97 engages the plate extension 103a and the device is "locked-up" out of operation.

Also as in the previously described form, the assembly may be raised vertically to its inoperative position by pressing on the handle 106 so that the stem 104 is subjected to angular movements about the fulcrum in the opening 105. The stem is attached at one end to the detent 26 which will be held in its raised and inoperative position by engagement of the plate extension with the shoulder 97 on the latch member when the stem 104 is moved angularly.

When it is desired to utilize the control device it is only necessary for the operator to pull out on the ring 102 for the purpose of releasing the latch, and the cam and detent assembly will drop into operative position with respect to the brake and accelerator pedals. The accelerator pedal is then depressed to a position past the detent 26 for backward abutment therewith, and the speed is adjusted by reciprocation of the stem 104. The vehicle will maintain a relatively constant speed until the operator releases the unit either by pressing on the brake pedal to cam the assembly upwardly to cause engagement of the latch 97, or by pressing downwardly on the handle 106 of stem 104.

With the arrangement shown in Fig. 9, the stem 104 and the bracket 101 are narrow, and hence can usually be installed clear of any interfering obstructions. Also, the stem may be offset somewhat if necessary to avoid interfering with another control of the vehicle or other obstructions. The system shown in Fig. 9 with the friction-holding spring 107 is the mechanical equivalent of a push-pull flexible shaft. However in the latter type of connection, the friction is in the cable, whereas in Fig. 9, the constraining friction is produced by the spring 107. If even more offset is desired, a flexible push-pull shaft may be used in place of the stem 104 and spring 107, and the detent 26 would be mounted for sliding movements as in the forms shown in Figs. 1–7.

Since the throttle is operated by the accelerator through a connecting linkage, all of which elements operate together as a fixed unit or assembly and is sometimes referred to herein as "control means," the inventive concept set forth herein would be unchanged if the device were connected to operate any part of the linkage. For this purpose, the form shown in Fig. 9 would be more suitable. For example, if the assembly which is secured to the firewall 91 and supported by bracket 92 were mounted adjacent any point of the linkage on the engine side of the firewall, it would make no difference under the inventive concept whether the detent 26 cooperates with any part of the linkage or an extension (or projection) thereof. Also, the brake pedal could have a link or similar extension through the firewall to reproduce the action of the cam member 22 in relation to the linkage connection. In this variation of the inventive concept disclosed herein, the shaft member 104 would be extended through the firewall, providing swingable or lateral motion is retained to accommodate the desired releasing movement of the detent transverse to the linkage at the abutting contact point thereof; a flexible push-pull shaft may be used for this purpose as above described. In this instance, the cable or flexible shaft 99 would extend through the firewall to operate the latching lever 94 or its equivalent.

Fig. 11 shows a modification of the supporting means of the cam and detent assembly shown in Figs. 9 and 10 in which a plurality of hinged links 111 and 112 are utilized to support and guide the bar 110. If space permits, this form of supporting means is preferred over the form shown in Fig. 9 since sliding-friction is completely eliminated.

Figs. 12 and 13 show a modification of the actuating mechanism of the device which is associated with the brake pedal. In these figures, the control device has been applied to a vehicle having a suspended type of brake pedal so that the actuating cam 22a carried by the brake pedal B must underlie the cam 20a carried by the arm 15 of the throttle control device. This type of brake pedal actuates its master cylinder 120 biased by spring 121 as shown in Fig. 12. The cam 22a is secured to the brake pedal by any suitable means, such as by bolts 122 mounted through slots 123 in the cam to permit adjustment thereof. It will be appreciated that operation of this mechanism is in all respects similar to the operation of the mechanism shown in Figs. 1 and 9, for example. The accelerator pedal C and its detent 26 with the link 38 are shown in Fig. 13. The detent 26 is connected to the arm 15 in Figs. 12 and 13 exactly as in Figs. 1 or 9.

It will be appreciated that in all instances shown herein the force of gravity is relied upon to return the control device to its operative position by means of vertical movements; but it will be appreciated that springs may be used to assist the gravitational force if this becomes necessary. Also other directions of movements which are practicable to perform the function of the present invention may be used if space will not permit the use of the preferred form shown in Fig. 1.

Many automotive vehicles are equipped with power brakes wherein a very slight depression of the brake pedal effects full actuation of the brakes, and the available motion for cam 22 in relation to cam 20 is quite short. In these instances, it is desired to have the cooperating faces of cams 20 and 22 relatively steep, which steepness is also desired to inactivate the control device every time the brake is depressed as described previously.

Several types of conventional power brakes use either engine vacuum or air pressure from a separate air pump. In this class of pneumatic power brakes, the depression of the accelerator pedal controls a valve which directs engine vacuum (or air pressure from the separate air pump), to a power booster unit using a diaphragm or piston for actuating the normal hydraulic brake system. Most power brakes are designed so that in the event of failure of the power brake unit, the vehicle can be stopped by pressing hard on the brake pedal. Such power brake construction is shown in Fig. 14 and is well known to those skilled in the art of brakes and are not a part of the present invention, and hence not shown in relation to the disclosure of Fig. 15. In Fig. 14 vacuum is transferred from the intake manifold 132 through the tube 134 to the vacuum power booster 136. Vacuum is directed to the booster element (not shown) when the brake B operates the master cylinder 120.

Fig. 15 shows a modification of Fig. 1 with similar parts designated by the same numerals. A fluid servomotor comprising a power diaphragm 140 secured to a housing 141 is supported on an extension 17a of the bracket 17. A link 142 connects the diaphragm with the arm 15 for actuation thereof. A counterbalance spring 143 may be used if desired to decrease the force required to lift the movable portion of the control device whose weight exceeds the force of the spring. The conduit 144 communicates with the vacuum transmitted by the controlling valve of the power brake to its booster unit when the brake pedal is depressed. Thus when the brake pedal is depressed and the power brake is energized by applied vacuum, the diaphragm 140 simultaneously is subjected to this same applied vacuum which instantly raises the arm 15 and the control device is "locked-up" out of operation by the locking devices shown in Figs. 1 and 9. If the vacuum should fail, the driver stops the vehicle by further pressure on the brake pedal; and in this instance the control device is inactivated by the previously described positive mechanical movements of cams 22 and 20 so that the structure is again completely safe.

If the device shown in Fig. 14 is connected by conduit 144 to an air pressure brake booster unit, then the direction of movement of diaphragm 140 must be reversed. In both instances, the control device is released to its operative position by the hand release means shown in either Figs. 1 or 9.

While the invention has been disclosed in conjunction with certain specific modifications it should be appreciated that numerous other modifications and changes will suggest themselves to those skilled in the art and that these are included within the scope of the appended claims.

I claim:

1. In a control device for an automotive vehicle having an engine and control means therefor normally urged toward the idle speed position, the combination of, a movable mechanism associated with said control means for positioning same, said mechanism including detent means movable into abutting position with respect to said engine control means to control the speed of said engine during normal operation of said control device, said detent means being disposed in relation to said engine control means during normal operation of said control device to prevent movements of said control means in a reduce-speed direction from its abutting position, but to permit completely unrestricted normal manual movements thereof in either direction at any position on the high-speed side of said abutting position of said control means, and release means to move said movable mechanism including said detent means to an inoperative position completely clear of the normal path of travel of said engine control means in a direction transverse to said last named direction of said abutting position, whereby said control means is free to return to its normal idle position without any possible interference from said mechanism.

2. The combination of means defined in claim 1, and said detent means being movable in two directions transverse to each other, one of said directions being substantially the same as the direction of said speed-controlling movements of said engine control means at said abutting position thereof, and said second direction comprising the said transverse direction of the releasing movement of said movable mechanism to completely clear the path of travel of said engine control means.

3. In a control device for an automotive vehicle having an engine, said vehicle having normal brake-actuating means and having engine control means normally urged toward the idle-speed position, the combination of, a movable mechanism including release means, said mechanism also including detent means movable into abutting position with respect to said engine control means to control the speed of said engine during normal operation of said control device, said detent means being disposed in relation to said engine control means during normal operation of said control device to prevent movements of said control means in a reduce-speed direction from its abutting position, but to permit completely unrestricted normal manual movements thereof in either direction at any position on the high-speed side of said abutting position of said control means, said brake-actuating means including means disposed to cooperate with said release means to move said movable mechanism to an inoperative position completely clear of the normal path of travel of said engine control means at least upon normal vehicle-stopping movement of said brake-actuating means, whereby said control means is free to return to its normal idle position without any possible interference from said mechanism.

4. The combination of means defined in claim 3, and said detent means being movable in relation to other elements of said mechanism, manually operable actuating means connected to said detent means to adjust the position thereof in said last-named movements and hence to select any desired position of said control means for establishing the speed of the engine.

5. In a control device for an automotive vehicle having an engine, said vehicle having normal brake-actuating means and having engine control means normally urged toward the idle-speed position, the combination of, a movable mechanism including release means, said mechanism also including detent means movable into abutting position with respect to said engine control means to control the speed of said engine during normal operation of said control device, said detent means being disposed in relation to said engine control means during normal operation of said control device to prevent movements of said control means in a reduce-speed direction from its abutting position, but to permit completely unrestricted normal manual movements thereof in either direction at any position on the high-speed side of said abutting position of said control means, said detent means being movable in two directions substantially transverse to each other, one of said detent movements being effective to control the speed of the engine, said brake-actuating means including means disposed to cooperate with said release means to move said movable mechanism including said detent means in a second of said two directions to an inoperative position completely clear of the normal path of travel of said engine control means at least upon normal vehicle-stopping movements of said brake-actuating means, whereby said control means is free to return to its normal idle position without any possible interference from said mechanism.

6. The combination of elements defined in claim 3, and means to guide said mechanism for movement to its normal operating position, and in which said detent means includes a portion acting as a cam, said cam-acting portion having a surface cooperating with a portion of said control means to move said mechanism in a direction sufficiently to allow said control means to be moved unrestrictedly in an increase-speed direction past said detent means until said last named means moves into abutting contact with said portion of said control means.

7. In a control device for an automotive vehicle having an engine, said vehicle having normal brake-actuating means and having engine control means normally urged toward the idle-speed position, the combination of, a movable mechanism including release means, said mechanism also including detent means movable into abutting position with respect to said engine control means to control the speed of said engine during normal operation of said control device, said detent means being disposed in relation to said engine control means during normal operation of said control device to prevent movements of said control means in a reduce-speed direction from its abutting position, but to permit completely unrestricted normal manual movements thereof in either direction at any position on the high-speed side of said abutting position of said control means, said brake-actuating means including means disposed to cooperate with said release means to move said movable mechanism to an inoperative position completely clear of the normal path of travel of said engine control means at least upon normal vehicle-stopping movements of said brake-actuating means, and a locking device associated with said mechanism to lock same in said inoperative position completely clear of said path of said control means, whereby said brake-actuating means and said engine control means are structurally normal and may be operated entirely in a normal manner without any possible interference with said movable mechanism.

8. The combination of means defined in claim 7, and manually controlled release means associated with said locking device to release said mechanism from its said locked position completely clear of said path of said control means, and means including guide means associated with said mechanism for directing same to its normal operating position in relation to said control means.

9. The combination of elements defined in claim 3, and means including guide means associated with said mechanism for directing same to its normal operating position, and in which said detent means includes a portion acting as a cam, said cam-acting portion having a surface cooperating with a portion of said control means to move said mechanism in a direction sufficiently to allow said control means to be moved unrestrictedly in an increase-speed direction past said detent means until said last named means moves into abutting contact with said portion of said control means, and said detent means being movable in relation to other elements of said mechanism, said detent means including movable actuating means to establish any operating position of said detent means in said last-named movements and hence the position of said control means.

10. The combination of elements defined in claim 5, wherein said speed-controlling movement of said detent means is substantially in the same direction as the direction of movement of said engine control means at said abutting position thereof, and wherein said second direction is in a substantially vertical plane, and means to mount said mechanism in said vehicle so that the force of gravity tends to lower at least a portion of said mechanism including said detent means to its normal operating position, and in which said detent means includes a portion acting as a cam, said cam-acting portion having a surface cooperating with said control means to raise said mechanism in said vertical direction sufficiently to allow said control means to be moved unrestrictedly in an increase-speed direction until said control means passes said detent means and permits same to drop into abutting contact with said control means, and movable actuating means operatively connected to said detent means to establish any desired operating position thereof and hence the position of said control means.

11. In an accelerator control device for an automotive vehicle having an engine, said vehicle having normal brake-actuating means and having engine control means including an accelerator pedal means for actuation thereof normally urged toward the idle speed position, the combination of, a movable mechanism including release means, said mechanism also including detent means movable into abutting position with respect to said accelerator pedal means to control the speed of said engine during normal operation of said control device, said detent means being disposed in relation to said accelerator pedal means during normal operation of said control device to prevent movements of said pedal means in a reduce-speed direction from its abutting position, but to permit completely unrestricted normal manual movements thereof in either direction at any position on the high-speed side of said abutting position of said accelerator pedal means, said brake-actuating means including means disposed to cooperate with said release means to move said movable mechanism to an inoperative position completely clear of the normal path of travel of said accelerator pedal means at least upon normal vehicle-stopping movements of said brake-actuating means, whereby said accelerator pedal means is free to return to its normal idle position without any possible interference from said mechanism.

12. In an accelerator control device for an automotive vehicle having an engine, said vehicle having normal brake-actuating means and having engine control means and an accelerator pedal means connected thereto for actuation thereof normally urged toward the idle speed position, the combination of, a movable mechanism including first release means, said mechanism also including detent means movable into abutting position with respect to said accelerator pedal means to control the speed of said engine during normal operation of said control device, said detent being movable in two directions substantially transverse to each other, one direction of movement being substantially the same as the direction of the speed-controlling movement of said accelerator pedal means at said abutting position, said detent means being disposed in relation to said accelerator pedal means during normal operation of said control device to prevent movements of said pedal means in a reduce-speed direction from its abutting position, but to permit completely unrestricted normal manual movements thereof in either direction at any position on the high-speed side of said abutting position of said accelerator pedal means, said brake-actuating means including second release means disposed to cooperate with said first release means to move said movable mechanism including said detent means in a second substantially vertical direction to an inoperative position completely clear of the normal path of travel of said accelerator pedal means at least upon normal vehicle-stopping movements of said brake-actuating means, whereby said accelerator pedal means is free to return to its normal idle position without any possible interference from said mechanism, and said movable mechanism including means to mount said mechanism in said vehicle to that the force of gravity tends to lower at least a portion of said mechanism including said detent means to its normal operating position, and said detent means including a portion acting as a cam, said cam-acting portion having a surface cooperating with said accelerator pedal means to raise said mechanism in said vertical direction to allow said pedal means to be moved unrestrictedly in an increase-speed direction until said pedal means passes said detent means and permits same to drop into abutting contact with said accelerator pedal means, and movable actuating means connected to said detent means to establish any desired operating position thereof and hence the position of said accelerator pedal means.

13. The combination of elements defined in claim 12, wherein said releasing movement is of positive mechanical action, and a positive locking device associated with said mechanism to lock same in a raised inoperative position completely clear of said accelerator pedal means and all parts associated therewith, whereby said brake-actuating means and said accelerator pedal means are entirely reinstated to their normal structural arrangement and may be operated entirely in a normal manner without any possible interference with said movable mechanism, and manually controlled release means associated with said locking device to release said mechanism from its said raised inoperative position to drop into its normal operating position.

14. The combination of means defined in claim 12, in which said mounting means includes swingable means, and said swingable means includes hinge means connected to a fixed support in said vehicle, whereby said substantially vertical movements of said movable mechanism are angular.

15. In a control device for an automotive vehicle having an engine and control means therefor, the combination of, a movable mechanism associated with said control means for positioning same, said mechanism including hinge means connected to a fixed support in said vehicle, said mechanism also including swingable means connected to said hinge means and disposed for angular movements in a direction substantially transverse to the direction of travel of said control means at a point thereof adjacent said swingable means, said swingable means including positioning means to hold said control means in abutting contact therewith for controlling the speed of said engine during normal operation of said control device, said positioning means being disposed in relation to said control means during normal operation of said control device to prevent movements of said control means in a reduce-speed direction from its abutting position, but to permit completely unrestricted normal manual movements thereof in either direction at any position on the high speed side of said abutting position of said control means, and release means to move said swingable means in said angular direction transverse to the direction of travel of said control means to an inoperative position completely clear of said engine control means.

16. The combination of means defined in claim 15, and an actuating member operatively connected to said positioning means for manual actuation thereof, a manual member connected to said actuating member and movable in relation thereto, said actuating member and said manual member being connected to said swingable means for angular movements therewith, fixed stop means associated with said fixed support, said stop means being disposed in relation to said manual member in a first position thereof to abut same for maintaining said swingable means and said cooperable positioning means in said inoperative position completely clear of said engine control means in all normal operating positions thereof, and said manual member in a second manually set position thereof standing out of said abutting relationship with said stop means to clear same whereby said swingable means and said positioning means are free to move into their operating positions.

17. In a control device for an automotive vehicle having an engine and control means therefor, the combination of, a movable mechanism associated with said control means for positioning same, said mechanism including positioning means movable into abutting position with respect to said control means for controlling the speed of said engine during normal operation of said control device, said positioning means being disposed in relation to said engine control means during normal operation of said control device to prevent movements of said control means in a reduce-speed direction from its abutting position, but to permit completely unrestricted normal manual movements thereof in either direction at any position on the high speed side of said abutting position of said control means, manually actuated means for effecting a releasing movement of said mechanism including said positioning means in a direction to completely clear the normal path of travel of said engine control means to effect a complete disconnection of said positioning means from said control means, spring pressed latch means having a portion fixed to the vehicle to hold said mechanism in inoperative position, said latch means including manually operated means for releasing said mechanism for movement into its operating position.

18. In a control device for an automotive vehicle having an engine and control means therefor, the combination of a substantially vertically movable mechanism associated with said control means for positioning same, said mechanism being lowered into its operating position by gravity forces in substantially a vertical direction, said mechanism including positioning means contacting said control means to hold same in the lowered position of said mechanism for controlling the speed of said engine during normal operation of said control device, and a counterbalance spring connected between a fixed support in said vehicle and said mechanism, said spring having an effective upward force less than said gravity forces but tending to raise said mechanism to reduce the net forces required to operate said mechanism in its vertical movements.

19. In a control device for an automotive vehicle having an engine and control means therefor, the combination of a substantially vertically movable mechanism associated with said control means for positioning same, said mechanism being lowered into its operating position by gravity forces in substantially a vertical direction, said mechanism including positioning means contacting said control means to hold same in the lowered position of said mechanism for controlling the speed of said engine during normal operation of said control device, said mechanism also including a base member disposed substantially parallel to the direction of travel of said control member at said holding contact of said positioning means, said positioning means being operatively connected to the said base member and located below same and disposed to move parallel thereto, a supporting member connected to said base member and positioned substantially transverse thereto, and guide means secured to a fixed portion of said vehicle and cooperating with said supporting member to guide the movements of said mechanism along a predetermined path in said substantially vertical direction.

20. The combination of means defined in claim 5, in which said mechanism includes a base member disposed substantially parallel to the direction of travel of said control member at said abutting position of said detent means, said detent means being connected to said base member and located below same and disposed to move parallel thereto, said first release means being secured to said base member and located below same, a supporting member connected to said base member and positioned substantially transverse thereto, and guide means secured to a fixed portion of said vehicle and cooperating with said supporting member to guide the movements of said mechanism along a predetermined path in said substantially vertical direction.

21. In a control device for an automotive vehicle having an engine and control means therefor, the combination of, a mechanism associated with said control means for positioning same, said mechanism including movable positioning means to hold said control means for controlling the speed of said engine during normal operation of said control device, said mechanism including a base portion, means connecting said positioning means to said base portion for slidable movements relative thereto, manually operated actuating means for selecting any desired position of said positioning means, said connecting means including spring means disposed to increase the friction between said positioning means and said base portion to maintain said selected position of said positioning means, and said base portion being so arranged to move said positioning means out of contact with said control means.

22. In a control device for an automotive vehicle having an engine, said vehicle having normal brake-actuating means and a fluid-operated power booster unit operated by said brake actuating means to assist the action thereof, said vehicle also having engine control means normally urged toward the idle speed position, the combination of, a movable mechanism including positioning means disposed to abut said engine control means in a position for controlling the speed of the engine during normal operation of said device, said mechanism including release means operated by said brake-actuating means to effect a releasing movement of said positioning means from said control means when said brake actuating means is depressed, a fluid device having connection with said mechanism to effect a releasing movement thereof slightly preceding said first mentioned releasing movement, said fluid device including a casing connected to a fixed support in said vehicle, said casing including a chamber, a pressure responsive member comprising a movable wall of said chamber and connected to said mechanism, said chamber being connected to the fluid pressure transmitted to said booster unit upon initial depression of said brake actuating means, whereby said pressure responsive member effects an automatic releasing movement of said positioning means to precede slightly said first-named releasing movement due to said first release-effecting means, and said last named release-effecting means producing a positive mechanical release upon further application of said brake-actuating means in the event of failure of said power brake booster unit.

23. In a control device for an automotive vehicle having an engine and control means therefor and a fixed member therein, the combination of, a movable mechanism associated with said control means for positioning same and movable in a direction substantially transverse to the direction of travel of said control means at a point thereof adjacent said mechanism, release means to move said mechanism in said transverse direction to an inoperative position completely clear of said engine control means, a manual member connected to said movable mechanism and movable in relation thereto but movable therewith in said transverse direction thereof, fixed stop means associated with said fixed member, said manual member being disposed in relation to said stop means in a first position of said manual member to abut said stop means for maintaining said movable mechanism in said inoperative position completely clear of said engine control means in all normal operating positions thereof, and said manual member in a second manually set position thereof standing out of said abutting relationship with said stop means to clear the same whereby said movable mechanism is free to move into its operating positions.

24. In a control device for an automotive vehicle having an engine and control means therefor and a fixed member therein, said vehicle having normal brake-actuating means, the combination of, a movable mechanism associated with said control means for positioning same and movable in a direction substantially transverse to the direction of travel of said control means at a point thereof adjacent said mechanism, said mechanism including positioning means to hold said control means for controlling the speed of said engine during normal operation of said control device, said mechanism including inactivating means operatively associated with said brake-actuating means to move said mechanism and said positioning means in said transverse direction to an inoperative position completely clear of said engine control means at least upon each normal vehicle-stopping operation of said brake-actuating means, said mechanism including a rotatable shaft member restrained against axial movement in said mechanism and having its axis in the direction of movement of said control means and threadedly connected to said positioning means for manual actuation thereof by rotation of said shaft member, a manual member operatively connected to said shaft member, said manual member and said shaft member including means to provide axial movements of said manual member in relation to said shaft member in at least two axial positions thereof and to provide for simultaneous rotary movements of said shaft member and said manual member to establish the position of said control means, said shaft member and said manual member being movable with said mechanism in said transverse direction, fixed stop means associated with said fixed member, said manual member being disposed in relation to said stop means in a first position of said two axial positions of said manual member to abut said stop means for maintaining said movable mechanism and said cooperable positioning means in said inoperative position completely clear of said engine control means in all normal operating positions thereof, and said manual member in a manually set second position of said two axial positions thereof standing out of said abutting relationship with said stop means to clear same whereby said movable mechanism and said positioning means are free to be moved into their operating positions, and means for automatically moving said manual member into said first axial position following each movement of said mechanism in said transverse direction produced by said inactivating means at least upon each vehicle-stopping operation of said brake-actuating means.

25. The combination of elements defined in claim 7, and said locking device including means to automatically lock said mechanism in said inoperative position at least upon normal vehicle-stopping operations of said brake-actuating means, and manually operated release means associated with said locking device to release said mechanism from its said locked position completely clear of said path of said control means for movement to its normal operating position, whereby the control device must be reset to said operating position after said vehicle-stopping operations of said brake-actuating means.

26. The combination of means defined in claim 5, and said means included in said brake-actuating means being arranged in relation to said release means to provide a positive mechanical movement of said movable mechanism to said inoperative position for releasing said control means.

27. The combination of means defined in claim 5, in which said detent means includes only one abutment for said engine control means.

28. In a control device for an automotive vehicle having an engine and control means therefor and having manual brake-actuating means, a movable mechanism associated with said control means for positioning same, said mechanism including positioning means to hold said control means for controlling the speed of said engine during normal operation of said control device, said positioning means being disposed in relation to said engine control means during normal operation of said control device to prevent movements of said control means in a reduce-speed direction from its abutting position, but to permit completely unrestricted normal manual movements thereof in either direction at any position on the high speed side of said abutting position of said control means, said brake-actuating means including means for effecting a releasing movement of said mechanism and said positioning means to an inoperative position completely clear of the normal path of travel of said engine control means to effect a complete disconnection of said positioning means from said control means, and a locking device to automatically lock said mechanism in said inoperative position at least upon each vehicle stopping actuation of said brake-actuating means.

29. In a control device for an automotive vehicle having an engine and control means therefor, the combination of, a movable mechanism associated with said control means for positioning same, said mechanism including positioning means to hold said control means for controlling the speed of said engine during normal operation of said control device, manually actuated means for effecting a releasing movement of said mechanism and said positioning means in a direction to completely clear the path of travel of said engine control means, said mechanism including manual means movable in relation to other elements in said mechanism to adjustably select the desired operating position of said control means, stop means secured to a fixed portion of said vehicle, said manual means cooperating with said stop means in a first position of said manual means for maintaining said mechanism in said first position completely clear of the path of travel of said control means, said manual means in a second position thereof disengaging from said stop means to permit said mechanism to move to its operating position, said manual means including spring means urging said manual means into said first position, and said manual means adapted to be moved manually to said second position in opposition to said spring means.

30. The combination of elements defined in claim 24, in which said means to provide axial movements of said manual member in relation to said shaft member and simultaneous rotary movements therewith includes axial slot means in one of said last two members, said other of said two members including guide means cooperating with said slot means to prevent relative rotary movements of said two members but to permit relative sliding axial movements thereof, said means for automatically moving said manual member including spring means between said two members urging said manual member into said first axially abutting position, and said manual member adapted to be moved manually to said second position in opposition to said spring means.

31. In a control device for an automotive vehicle having an engine and control means therefor, said vehicle having conventional brake-actuating means and accelerator means installed in the vehicle-operator compartment for operation of said control means, hinge means secured to a fixed portion of said vehicle, a movable mechanism in said compartment supported by said hinge means for angular movements of said mechanism, said mechanism including a rotatable shaft member restrained against axial movements in said mechanism and having portions extending in opposite directions of said hinge means to produce a lever action thereof about said hinge means acting as a flucrum, said mechanism including a detent member including a portion located on the accelerator-means side of said hinge means and angularly movable with said mechanism in a direction substantially transverse to the movements of said accelerator means into abutting position with respect thereto to position the same for controlling the speed of said vehicle during normal operation of said device, said detent member being disposed in relation to said accelerator means during normal operation of said control device to prevent movements of said accelerator means in a reduce-speed direction from its abutting position, but to permit completely unrestricted normal manual movements thereof in either direction at any position on the high-speed side of said abutting position of said accelerator means, said shaft member having its axis in substantially the same direction as the direction of movement of said accelerator means and threadably connected to said detent member for actuation thereof by rotation of said shaft member, a manual adjusting member operatively connected to said shaft member on the operator side of said hinge means, said connection of said manual member and said shaft member including means to provide for axial movements of said manual member in relation to said shaft member in at least two axial positions thereof and to provide for simultaneous rotary movements of said shaft member and said manual member to establish the position of said accelerator means and hence the speed of the vehicle, said shaft member and said manual member being angularly movable with said mechanism to provide movement of said detent means in one direction and simultaneous movement of said manual member in a direction opposite to said last-named direction, an abutment member secured to a fixed portion of said vehicle and extending a predetermined distance from said hinge means to said manual member, spring means providing an axial force between said manual member and said shaft member urging said manual member into a first position of said two axial positions closest to said hinge means under the end of said abutment member to abut outwardly against the same for maintaining said detent member in an inoperative position completely clear of the path of travel of said accelerator means in all normal operating positions thereof, said manual member being manually movable to a second axial position away from said hinge means for standing out of said outwardly abutting relationship with said abutment member to clear same for permitting said detent means to move into its operating position for holding said accelerator means during operation of said vehicle, said last-named movement of said detent member simultaneously moving said manual member into position for axial abutment against the end of said abutment member extension due to said force of said spring means to maintain said manual member in said second axial position when said device is in operation, said mechanism including cam means operatively associated with said brake-actuating means for providing a positive mechanical release action of said accelerator means by moving said detent member to said inoperative position at least upon each normal vehicle-stopping operation of said brake-actuating means, said last-named releasing movement simultaneously transpositioning said manual member out of said axial abutment with respect to said abutment member to permit said spring means automatically to move said manual member axially into said outwardly abutting position under said abutment member for positively locking said device out of operation until reactivated by manual movement of said manual member away from said hinge means to said second axial position.

32. The combination of elements defined in claim 31, in which said detent member includes only one abutment for said engine control means, and in which said detent member includes a portion acting as a cam, said cam-acting portion having a surface cooperating with said accelerator means to move said mechanism and said detent member in said substantially transverse direction sufficiently to allow said accelerator means to be moved by the operator unrestrictedly in an increase-speed direction while maintaining said axially abutting relationship of said manual member and said abutment member until said accelerator means passes said detent member and permits the same to move into said abutting position with respect to said accelerator means.

33. In a control device for an automotive vehicle having an engine and control means therefor, the combination of, a movable mechanism associated with said control means for positioning same, said mechanism including hinge means connected to a fixed support in said vehicle, said mechanism also including swingable means connected to said hinge means and disposed for arcuate movements in a substantially vertical plane in a direction substantially transverse to the direction of travel of said control means at a point thereof adjacent said swingable means, said swingable means including positioning means to hold said control means for controlling the speed of said engine during normal operation of said control device, said swingable means and said positioning means having sufficient weight in relation to other elements of said mechanism that the force of gravity tends to move said positioning means into said speed controlling position thereof, and spring means connected to said mechanism to produce any desired net force on said swingable means and said detent means due to the weight forces thereof and the force of said spring means.

References Cited in the file of this patent

UNITED STATES PATENTS

| | | |
|---|---|---|
| 1,815,773 | Gray | July 21, 1931 |
| 2,087,819 | Sheneman | July 20, 1937 |
| 2,118,730 | Kalbreier | May 24, 1938 |
| 2,203,446 | Shearer | June 4, 1940 |
| 2,230,742 | Bush | Feb. 4, 1941 |
| 2,313,000 | Haugel | Mar. 2, 1943 |
| 2,477,865 | Du Charme | Aug. 2, 1949 |
| 2,490,473 | Rodkey | Dec. 6, 1949 |
| 2,624,433 | Godbout | Jan. 6, 1953 |

FOREIGN PATENTS

| | | |
|---|---|---|
| 474,471 | Germany | Apr. 4, 1929 |